G. DIECKMANN.
BROOM.
APPLICATION FILED MAR. 26, 1910.
971,362.
Patented Sept. 27, 1910.
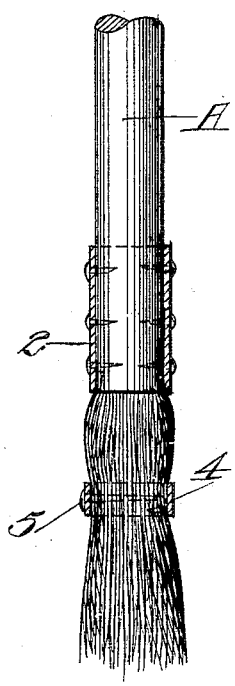
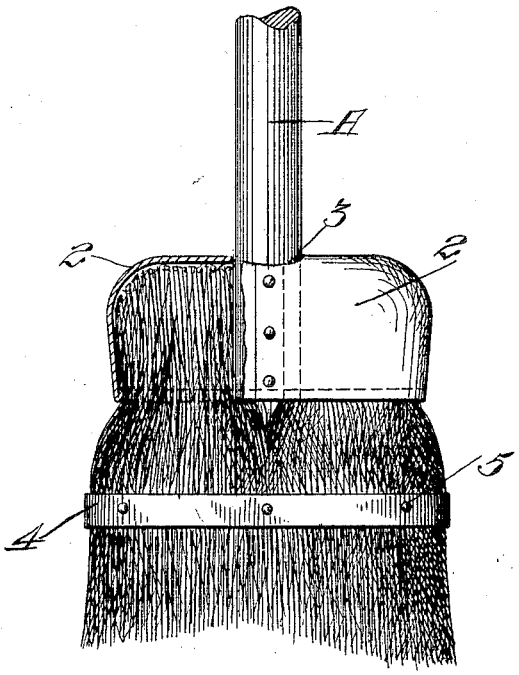
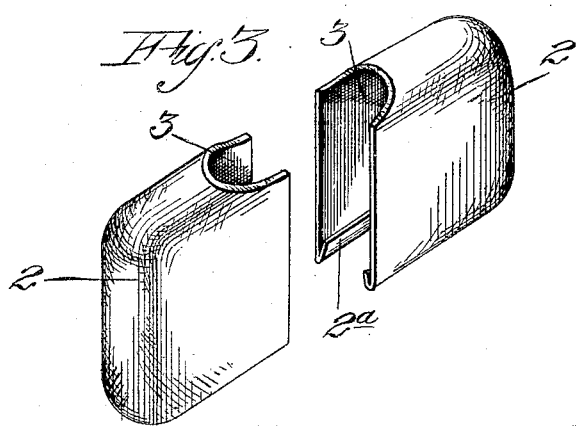
Witnesses.
Thos. Castberg
F. E. Maynard.
Inventor.
Gustav Dieckmann
by
G. H. Strong,
his Atty.
THE NORRIS PETERS CO., WASHINGTON, D. C.

UNITED STATES PATENT OFFICE.

GUSTAV DIECKMANN, OF SAN FRANCISCO, CALIFORNIA.

BROOM.

971,362.  Specification of Letters Patent.  Patented Sept. 27, 1910.

Application filed March 26, 1910. Serial No. 551,780.

*To all whom it may concern:*

Be it known that I, GUSTAV DIECKMANN, a citizen of the United States, residing in the city and county of San Francisco and State of California, have invented new and useful Improvements in Brooms, of which the following is a specification.

My invention relates to improvements in brooms, and it consists in a novel means for clamping the broom straw into proper form, and in securing it to the handle.

The invention comprises the combination of parts and details of construction which will be more fully explained by reference to the accompanying drawings, in which—

Figure 1 is a partly sectional view showing my invention. Fig. 2 is a section at right angles to Fig. 1. Fig. 3 is a perspective view of the clamps.

It is the object of my invention to provide a means for rapidly and efficiently binding the straw of which brooms are composed into a proper shape, and securing it to the handle, and for this purpose I provide transversely slidable shells, with parallel or slightly convergent ends or sides, the upper ends of the straw being first introduced into these shells, and the shells then forced toward each other until the straw is sufficiently clamped and bound in position when the overlapping edges of the shells are nailed to the lower end of the broom handle, and one or more retaining bands may afterward be clasped about the body of the broom lower down.

A is the handle of a broom of any usual or suitable construction.

2 are shells which may be stamped or pressed out of sufficiently stiff sheet material, or otherwise formed. These shells have sufficient depth to receive and inclose the upper ends of a mass of broom straw sufficient to form a broom. The ends and sides of these shells are parallel, or preferably converge a little from the closed upper to the open lower end, and may have the lower edges turned inwardly as at $2^a$ so as to form a certain grip upon the upper ends of the straw which will prevent its being withdrawn from the shells after having been secured, and will obviate the necessity of any other fastening. These two shells are so made as to telescope transversely, one within the other, and they have cut out segments 3 at the upper end through which the broom handle will pass when the whole is assembled.

The broom is assembled as follows: A sufficient mass of broom straw properly arranged is introduced into each of the shells 2, the upper ends of the straw extending substantially to the interior top of the shells, and the shells are placed upon each side of the lower end of the broom handle. By means of a compressing device, not here shown, the shells are then forced inwardly, the inner edges of one sliding over and overlapping the inner edges of the other upon opposite sides of the broom handle, and by reason of the parallel or convergent form of the outer ends and sides the broom straw will be firmly held between the interior of these shells and the handle of the broom. When this has been effected, it is only necessary to drive nails through the overlapping edges and into the handle, and the straw is so firmly secured that it cannot be withdrawn, and no stitching or folding is necessary.

In order to retain the body of the broom and prevent it from spreading too much at the lower end, I employ one or more bands 4 which surround the broom and are made continuous by suitably uniting their meeting ends by soldering or otherwise. I then drive nails 5 through the band and the straw of the broom. These nails are sufficiently malleable or yielding, and have a sufficient length so that when driven through the band on one side, the opposite end of the nail encountering the inside of the band on the opposite side, will be turned over into a hook form, and thus securely clamp the parts together without the necessity of heading them upon the outside of the bands, and the construction thus produced is much neater than if the latter method was adopted.

It will be understood that the shells 2 may be made open at the upper end instead of closed, but in either construction an essential feature is a formation and securing in such a manner that a considerable portion of the upper end of the straw will be clamped and secured without binding, twisting or sewing.

Having thus described my invention, what I claim and desire to secure by Letters Patent is—

1. In a broom, the combination of a pair of transversely slidable hollow shells open at the bottom to receive the broom straw, and having openings at the top through which the broom handle is inserted, said shells having vertical or downwardly convergent outer ends and sides, and having their inner edges adapted to overlap, and means passing through the overlapped edges of both shells for securing said shells to the handle to compress and clamp the upper ends of the straw thereto.

2. The combination in a broom, of a handle, similar hollow shells adapted to slide transversely of the broom and endwise one on the other having the outer ends and sides downwardly convergent, and having inturned lower edges, an opening at the top to receive a broom handle, and broom straw confined between the shells and the handle, and means to secure the overlapping edges to each other and to the handle.

In testimony whereof I have hereunto set my hand in the presence of two subscribing witnesses.

GUSTAV DIECKMANN.

Witnesses:
CHARLES A. PENFIELD,
CHARLES EDELMAN.